United States Patent
Aultman et al.

[11] Patent Number: 6,050,741
[45] Date of Patent: Apr. 18, 2000

[54] TOOL CLAMPING DEVICE

[75] Inventors: William H. Aultman, Pickens; Robert A. Grogan, Salem, both of S.C.

[73] Assignee: Power Tool Holders Incorporated, Wilmington, Del.

[21] Appl. No.: 09/016,220

[22] Filed: Jan. 30, 1998

[51] Int. Cl.$^7$ ....................................................... B25G 3/20
[52] U.S. Cl. .................. 403/374.1; 403/373; 403/409.1; 403/256; 411/432; 411/917; 279/62
[58] Field of Search .................................. 403/373, 374.1, 403/374.2, 350, 409.1, 259, 260, 261, 256; 411/432, 917, 408; 279/62; 451/342, 508, 509, 510

[56] References Cited

U.S. PATENT DOCUMENTS

| | | |
|---|---|---|
| 2,704,426 | 3/1955 | Macaulay . |
| 2,784,976 | 3/1957 | Ondeck . |
| 3,756,092 | 9/1973 | Gärtner . |
| 3,894,743 | 7/1975 | Hiroumi . |
| 3,912,411 | 10/1975 | Moffat . |
| 4,176,582 | 12/1979 | Witte . |
| 4,322,190 | 3/1982 | Anderson . |
| 4,434,586 | 3/1984 | Müller et al. . |
| 4,525,097 | 6/1985 | Ziegelmeyer . |
| 4,637,170 | 1/1987 | Block . |
| 4,655,006 | 4/1987 | Block . |
| 4,841,796 | 6/1989 | Teramachi . |
| 4,850,154 | 7/1989 | Grammer et al. . |
| 4,864,884 | 9/1989 | Klinkenberg . |
| 4,941,790 | 7/1990 | Kirn . |
| 4,955,744 | 9/1990 | Barth et al. . |
| 4,976,071 | 12/1990 | Stäbler . |
| 4,980,994 | 1/1991 | Helm et al. . |
| 5,022,188 | 6/1991 | Borst . |

(List continued on next page.)

FOREIGN PATENT DOCUMENTS

| | | |
|---|---|---|
| 0381809A2 | 8/1990 | European Pat. Off. . |
| 0344154B1 | 4/1992 | European Pat. Off. . |
| 0480163A1 | 4/1992 | European Pat. Off. . |
| 0588483A2 | 8/1993 | European Pat. Off. . |
| 0231500B1 | 4/1994 | European Pat. Off. . |
| 2101513 | 3/1972 | France . |
| 163837 | 8/1949 | Germany . |
| 3012836C2 | 9/1985 | Germany . |
| 3824040C1 | 11/1989 | Germany . |
| 3831236A1 | 3/1990 | Germany . |
| 3832624C2 | 8/1990 | Germany . |
| 3903765A1 | 8/1990 | Germany . |

(List continued on next page.)

OTHER PUBLICATIONS

U.S. Patent Application Serial No. 08/971,757.
U.S. Patent Application Serial No. 09/086,890.

*Primary Examiner*—Lynne H. Browne
*Assistant Examiner*—John R. Cottingham
*Attorney, Agent, or Firm*—Dority & Manning

[57] ABSTRACT

A clamping device for holding a rotating tool or stationary object to a threaded shaft of a power tool or machine includes a body member having an annular ring configured therewith. The annular ring has at least two concentric ramped bearing surfaces defined on an inner axial face thereof. An operating ring is rotationally mounted on the body member and has an axial face with concentric ramped bearing surfaces defined thereon oppositely facing the bearing surfaces on the annular ring. The operating ring has a second axial face with at least one unramped bearing surface defined thereon. A flange member has an inner axial face opposite the operating ring second axial face. The flange member is axially movable relative to the body member and presses against and clampingly holds a rotating tool relative to a drive shaft upon manual rotation of the operating ring in a tightening direction. A bearing device is disposed between the ramped bearing surfaces of the annular ring and the operating ring. Upon rotation of the operating ring in the tightening direction, high sections of the ramped bearing surfaces approach each other causing the flange member to move axially outward to clamp against a tool to be held to a drive shaft.

20 Claims, 8 Drawing Sheets

U.S. PATENT DOCUMENTS

| | | |
|---|---|---|
| 5,042,207 | 8/1991 | Kirn . |
| 5,044,643 | 9/1991 | Nakamura . |
| 5,161,334 | 11/1992 | Schaal et al. . |
| 5,175,963 | 1/1993 | Schäfer et al. . |
| 5,177,905 | 1/1993 | Takahashi . |
| 5,259,145 | 11/1993 | Fushiya et al. . |
| 5,261,679 | 11/1993 | Nakamura . |
| 5,388,942 | 2/1995 | Bonacina et al. . |
| 5,466,106 | 11/1995 | Bone et al. . |
| 5,494,368 | 2/1996 | Matthews . |
| 5,518,440 | 5/1996 | Bone . |
| 5,545,078 | 8/1996 | Schulz et al. . |
| 5,567,100 | 10/1996 | Nakamura . |
| 5,577,872 | 11/1996 | Nakamura . |
| 5,584,753 | 12/1996 | Takahoshi . |
| 5,651,726 | 7/1997 | Skogsberg . |

FOREIGN PATENT DOCUMENTS

| | | |
|---|---|---|
| 3903766A1 | 8/1990 | Germany . |
| 3903767A1 | 8/1990 | Germany . |
| 4031725A1 | 4/1992 | Germany . |
| 4102420A1 | 7/1992 | Germany . |
| 4209146A1 | 9/1992 | Germany . |
| 4238466 C1 | 1/1994 | Germany . |
| 4243328C1 | 6/1994 | Germany . |
| 4305317A1 | 9/1994 | Germany . |
| 57-184610 | 11/1982 | Japan . |
| 4-210308 | 7/1992 | Japan . |
| 7-299742 | 11/1995 | Japan . |
| 7-299743 | 11/1995 | Japan . |
| 7-314328 | 12/1995 | Japan . |
| 825877 | 12/1959 | United Kingdom . |
| 967516 | 8/1964 | United Kingdom . |
| WO8804975 | 7/1988 | WIPO . |
| WO8806075 | 8/1988 | WIPO . |
| WO9000463 | 1/1990 | WIPO . |
| WO9006210 | 6/1990 | WIPO . |
| WO9619677 | 6/1996 | WIPO . |
| WO9725542 | 7/1997 | WIPO . |
| WO9727020 | 7/1997 | WIPO .- |

TOOL CLAMPING DEVICE

BACKGROUND OF THE INVENTION

The present invention relates to a clamping device, such as a screw or nut, for clamping a rotating tool or stationary object, such as a grinding wheel, circular saw blade, etc., to a threaded drive spindle.

When attaching a rotating tool to a drive shaft of a power tool, in conventional practice a flange and a male thread are formed at the end of the drive shaft and the rotating tool is inserted over this male thread. A clamping nut having a female thread is screwed onto the threaded drive shaft and clamps the tool against the flange. Typically, a tightening tool such as a wrench is needed to tighten the clamping nut onto the drive shaft and also to loosen the clamping nut to change out the tool.

One downfall of the use of an external tool, such as a wrench, for tightening the clamping nut as described above, is that alignment of the power tool may become unbalanced and its work performance may deteriorate. Additionally, in many applications, it is cumbersome, if not impossible, to fit a wrench or other tightening device onto the clamping nut depending on the working application of the power tool. Thus, if the clamping nut can be attached by manual rotation only, work performance and efficiency can be greatly improved.

However, when the nut is rotated in a manual operation, a loss in clamping force occurs due to frictional resistance in the threaded portions of the shaft and clamping nut, with the difficulty that it is not possible to create a sufficient clamping force in the manual operation alone. Additionally, there is also the possibility that a tightening thrust of the rotating tool imparted to the clamping nut will cause the clamping screw to overtighten if left unchecked to the point where it is impossible to remove the clamping nut in a manual operation.

The present invention relates to an improved clamping device that enhances or increases a manual clamping force while also checking or limiting overtightening of the device from operational thrust of the rotating tool so that the clamping device is readily removed in a manual operation.

OBJECTS AND SUMMARY OF THE INVENTION

It is therefore a principal object of the present invention to provide an improved clamping device for clamping a rotating tool or stationary object to a threaded shaft.

Another object of the present invention is to provide a clamping device having torque enhancing features wherein a sufficient clamping force can be applied in a manual operation.

Still a further object of the present invention is to provide a clamping device that checks or limits the degree of reverse thrust imparted to the clamping screw from the rotating tool so that the clamping screw is readily removable from the threaded drive shaft in a manual operation.

Additional objects and advantages of the invention will be set forth in part in the following description, or may be obvious from the description, or may be learned through practice of the invention.

In accordance with the objects and purposes of the invention, a clamping device, such as a nut or screw, is provided for holding a rotating tool, such as a saw blade or grinding wheel, to a threaded drive shaft such as that of a power tool. The clamping device can also be used in any application wherein a clamping device is used to hold an object to a shaft, regardless of whether the object is rotating or stationary.

The clamping device includes a body member having a threaded surface or member for threaded engagement with the drive shaft of the power tool. An annular ring is configured with the body member and includes an inner axial face with at least one ramped bearing surface, and preferably two concentric ramped bearing surfaces, or races defined thereon. The ramped surfaces may be essentially circular and are ramped from a lowest portion to a highest portion. Preferably, the ramped surfaces are gradually ramped around the entire circumference thereof so that the highest ramped portions are essentially adjacent to the lowest ramped portions.

An operating ring is rotationally mounted on the body member and is configured for accepting an externally applied manual rotational drive force. In one preferred embodiment, a sleeve member or similar device is rotationally fixed, for example by a press-fit, to the outer circumferential surface of the operating ring. The sleeve member defines a gripping surface for manual rotation of the operating ring. The operating ring further includes a first axial face that is disposed opposite from the annular ring inner axial face. This first axial face has a matching number of ramped bearing surfaces defined thereon oppositely facing from the ramped bearing surfaces on the annular ring. The operating ring further includes a second axial face with at least one bearing surface defined thereon. This bearing surface is essentially flat or unramped.

The clamping device further includes a flange member having an inner axial face opposite the operating ring second axial face. The flange member also has an outer axial face configured for pressing against and clampingly holding a rotating tool or other object, such as a grinding wheel or saw blade, relative to the drive shaft by pressing the tool against a flange defined on the drive shaft, as is commonly understood in the art. The flange member of the clamping device is rotatably mounted on the body member and is also axially movable to a limited extent relative to the body member.

A bearing device, such as a plurality of bearing balls, is disposed between the ramped bearing surfaces. In a preferred embodiment of the invention, the bearing devices comprise balls and the bearing surfaces comprise ramped ball races defined in the annular ring and operating ring. Preferably, a continuous line of such bearing balls are provided. Also, a plurality of bearing balls, or similar bearing mechanism, are disposed between the oppositely facing bearing surfaces of the operating ring and the flange member inner axial face.

With this unique combination, the operating ring is manually movable from an at-rest or unclamped position wherein the lowest portions of the ramped ball races on the annular ring and operating ring are oppositely facing or aligned, to a clamping position wherein the highest portions of the ramped ball races are oppositely facing and aligned thereby causing the flange member to be forced axially outward. In other words, as the highest ramped portions come into alignment, the operating ring is forced axially away from the annular ring. This action, in turn, causes the flange member to also be moved axially outward to clamp against the rotating tool.

In one preferred embodiment of the invention, the operating ring is biased towards the at-rest or unclamped position. For example, a resilient member, such as a spring, can be operationally disposed between the operating ring and the annular ring member to bias the operating ring to a position wherein the lowest portions of the ramped surfaces are oppositely facing. Thus, when the clamping device is removed from the drive shaft of the power tool, the operating ring will automatically return the clamping device to its unclamped or at-rest position. In this embodiment, the operating ring may include a dog or other radially extending member that is in engagement with one end of the spring while the other end of the spring is in engagement with a stop defined on the annular ring member.

In operation, the clamping device is initially in its unclamped or at-rest position and is threaded onto the drive shaft of a spindle as a single unitary device due to internal frictional loading of the components. Eventually, the flange member comes into contact with the rotating tool and the frictional forces between the flange member and rotating tool will overcome the internal frictional loading of the device. At this point, the body member will not be threaded any further onto the drive spindle and further rotation of the operating ring member will cause the clamping device to move into its clamping position as the highest portions of the ramped surfaces defined on the operating ring will be rotated towards the highest ramped portions defined on the annular ring. As this action occurs, the operating ring is moved axially away from the annular ring and is also rotating relative to the flange member. The operating ring thus forces the flange member axially outward to increase the clamping force of the clamping device against the rotating tool without further threaded engagement of the body member on the drive shaft. Theoretically, the maximum clamping force applied by the flange member occurs when the two highest portions of the ramped surfaces are exactly opposite. However, it should be appreciated, that the "clamping position" can occur anywhere between the lowest ramped portions and highest ramped portions. In other words, the operating ring need not be rotated to its maximum extent to obtain a sufficient clamping force.

In a preferred embodiment of the invention, the operating ring is maintained in its tightened rotational position by the internal frictional loading of the components in the clamped state and an additional rotational locking device is not necessary. In the clamped state, the internal frictional loading is sufficient to prevent the resilient member or spring from returning the operating ring to its unclamped position. However, it is within the scope and spirit of the invention to include an additional rotational locking device or mechanism for the operating ring.

Manual loosening of the device is a relatively simple procedure. The operator simply grasps the sleeve member and rotates the operating ring to the loosening direction. This action moves the lowest ramped portions into alignment and thus allows the flange member to move axially away from the rotating tool surface. At this point, only the frictional resistance between the threads of the body member and drive shaft needs to be overcome in the manual operation. The thread pitch of the threads defined on the body member is selected so that removal is a relatively easy operation. Additionally, the removal operation is aided by the biasing effect of the spring to return the operating ring to its unclamped position.

DETAILED DESCRIPTION OF THE PREFERRED EMBODIMENTS

Figure 1:
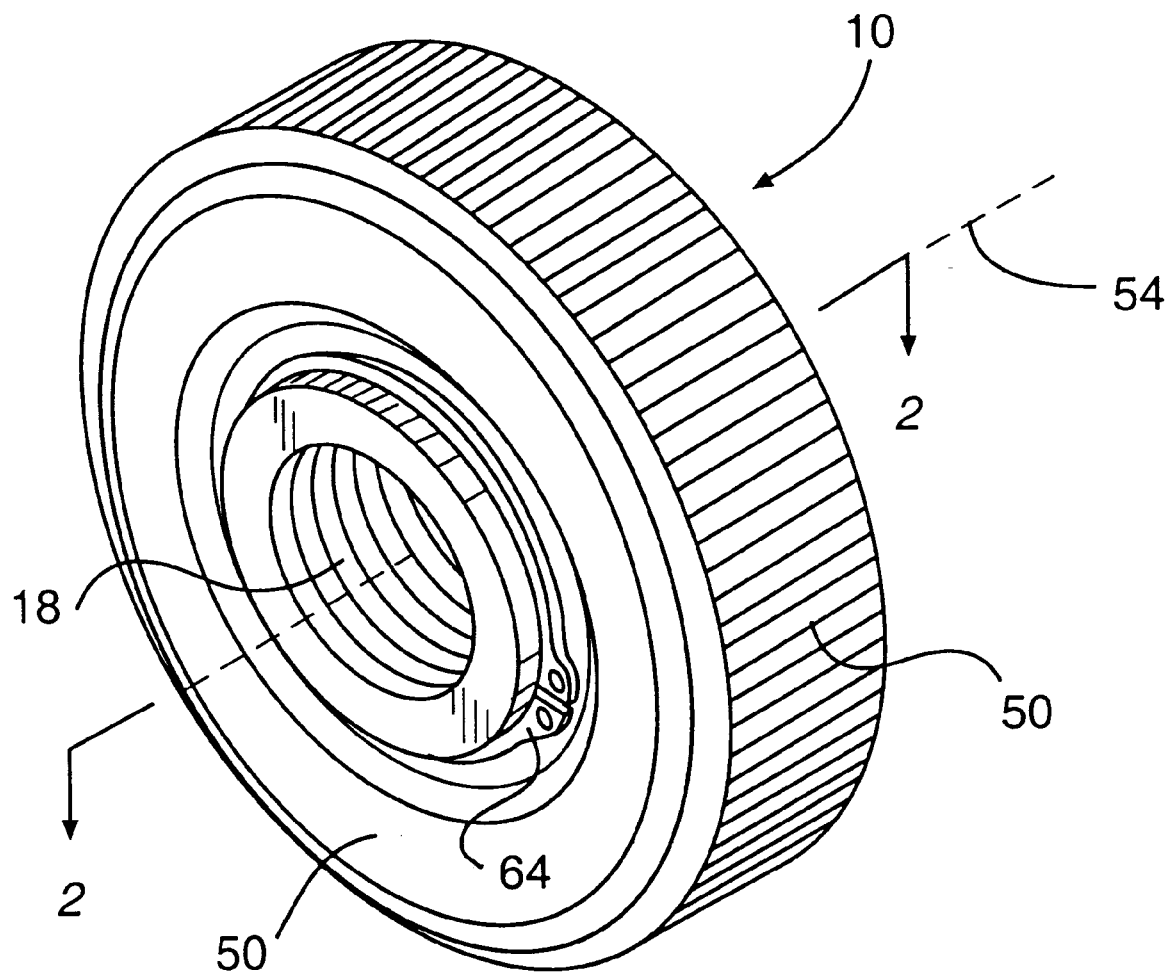
FIG. 1 is a perspective view of an embodiment of the invention illustrated as a clamping nut.

Reference will now be made in detail to the presently preferred embodiments of the invention, one or more examples of which are illustrated in the drawings. Each example is provided to explain the invention, and is not meant as a limitation of the invention. For example, features illustrated or described as part of one embodiment, can be used in another embodiment to yield still a further embodiment. It is intended that the present description include such modifications and variations as come within the scope and spirit of the invention.

The clamping device according to the present invention is illustrated generally in the figures as a clamping nut for holding a rotating tool relative to a drive spindle. For example, referring to FIG. 4, clamping device 10 is illustrated as a nut that is threadedly received onto a threaded portion 15 of a drive spindle 14. Nut 10 holds a rotating tool 12, such as a grinding wheel, against a shoulder or flange member 17 defined on shaft 14, as commonly understood in the art.

It should be appreciated, however, that the present clamping device is not limited to a clamping nut. The present invention is just as applicable to a clamping bolt or screw wherein the device includes a threaded male member that is threadedly received in a female threaded member. For ease of explanation and illustration only, the present clamping device is illustrated and described as a clamping nut. It should also be appreciated that the present inventive clamping device is not limited to clamping rotating tools, but can be used in any application wherein an object, including a stationary object, is clampingly held on a shaft.

Clamping device 10 includes a body member, generally 16, having a threaded surface for engagement with a threaded drive shaft 14. As mentioned above, in the illustrated embodiment, the body member threaded surface is defined by a threaded inner circumferential surface 18 so that mechanism 10 is essentially a clamping nut mechanism.

An annular ring 20 is configured with body member 16 at one end thereof. Body member 16 also includes a threaded stem portion 21 that defines inner circumferential threaded surface 18. Preferably, annular ring 20 may be formed as an integral component of body member 16, as illustrated in the figures. Alternatively, annular ring 20 may comprise a separate component that is rotationally fixed onto body member 16. Annular ring 20 includes an inner axial face 22. Axial face 22 has at least one ramped bearing surface, and preferably two ramped bearing surfaces 24' and 24" defined therein. Ramped surface 24' may be defined as an outer circumferential ball race and ramped surface 24" as an inner circumferential ball race. Ramped surfaces 24' and 24" can be provided individually. The particular structure of the ramped surfaces or ball races will be described in greater detail below.

Figure 3:
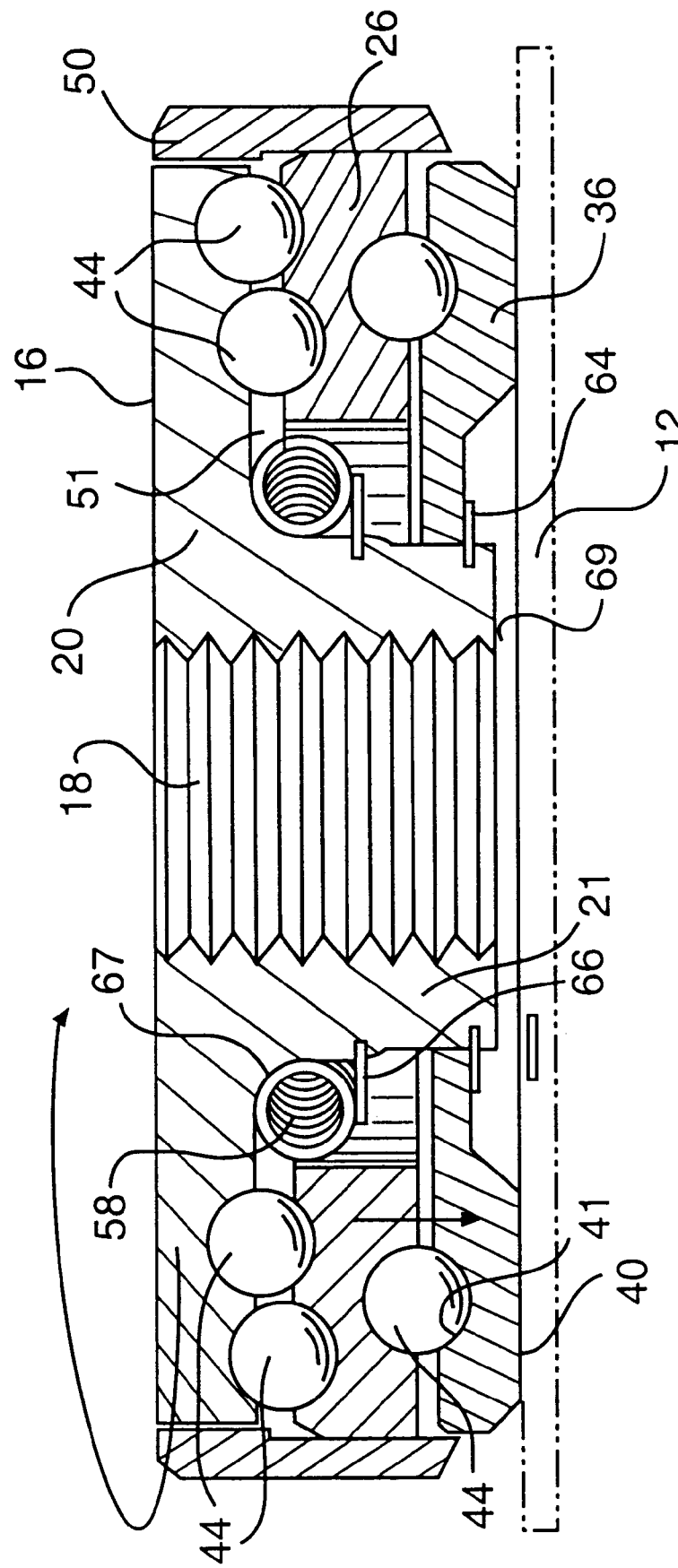
FIG. 3 is another cross-sectional view of the clamping nut shown in its tightened or clamping position.

Clamping device 10 also includes an operating ring 26 rotationally mounted on body member 16, for example rotatable about stem portion 21. operating ring 26 is configured to receive an externally applied tightening or torquing force, as generally illustrated by the arrow in FIG. 3. This externally applied force may be applied manually in a tightening operation of the device. In this regard, operating ring 26 is also configured with a sleeve member 50 rotationally fixed thereto. For example, sleeve member 50 may be press-fitted onto operating ring 26, or otherwise rotationally fixed thereto. Sleeve member 50 may also include a grip enhancing surface 52, such as longitudinal ridges, to enhance the manual tightening and loosening operation.

Operating ring 26 also includes a first axial face 28 that is opposite inner axial face 22 of annular ring 20. This axial face 28 also includes at least one ramped bearing surface, and preferably two concentric ramped bearing surfaces 30' and 30" defined thereon which are oppositely facing ramped bearing surfaces 24' and 24". A bearing mechanism, such as bearing balls 44, is disposed between the opposing ramped bearing surfaces of axial faces 28 and 22, as illustrated in detail in the figures. Operating ring 26 also includes a second or opposite axial face 32 having a relatively flat or unramped bearing surface 34 defined therein. Surface 34 may comprise a circular groove or ball race defined in axial face 32.

In a preferred embodiment of device 10 illustrated in the figures, the bearing mechanism comprises continuous rolling balls 44, and the ramped bearing surfaces are defined as ramped circular ball races. It should be appreciated, however, that any manner of conventional bearing devices and respective bearing surfaces can be utilized in this regard. For example, it is within the scope of the invention that the bearing mechanism may be a bearing washer or ring, or even a coating applied to the oppositely facing ramped bearing surfaces.

Figure 4:
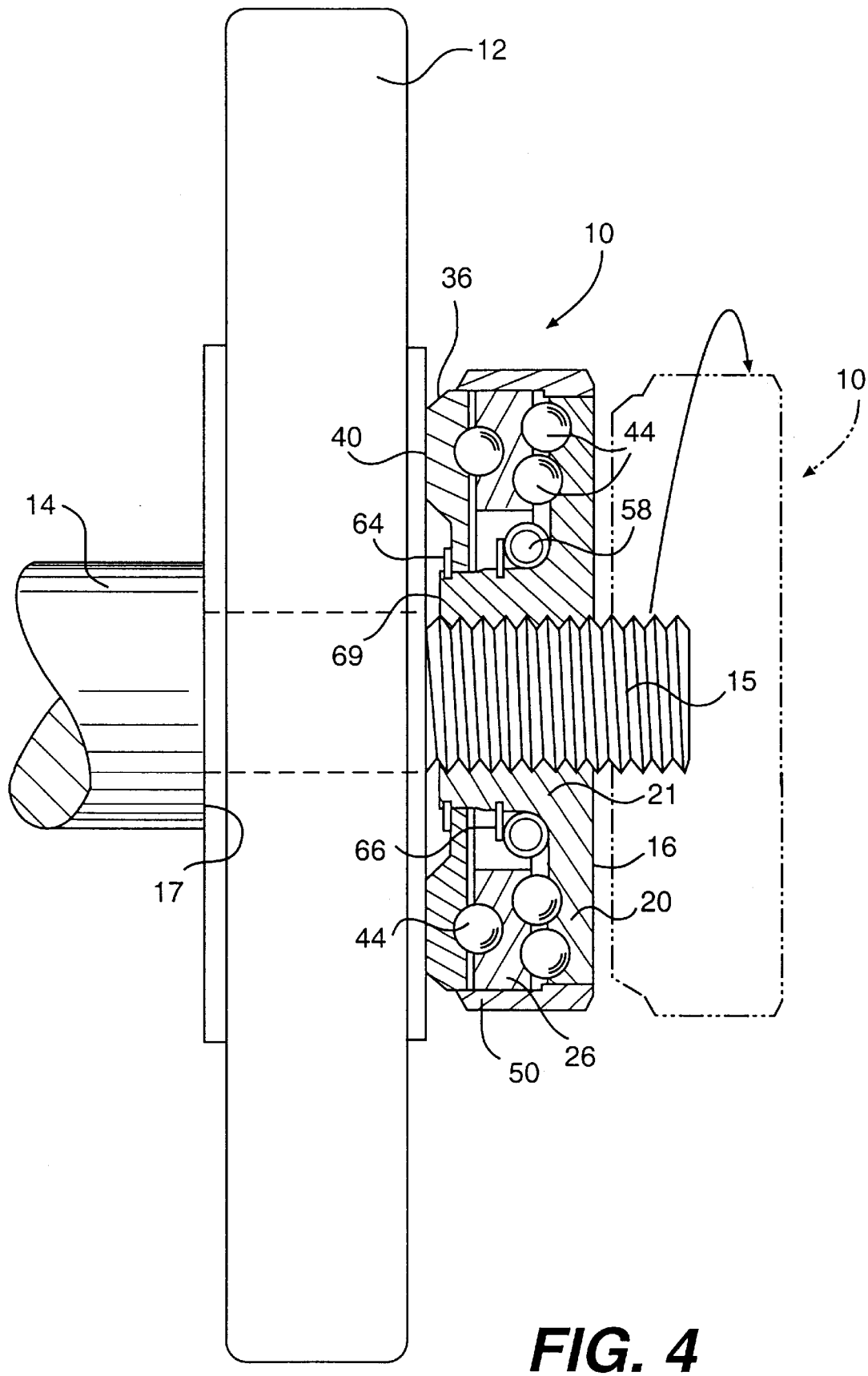
FIG. 4 is a cross-sectional operational view of the clamping nut holding a rotating tool to a drive shaft.

Clamping device 10 also includes a flange member 36 having an outer axial face 40 configured for pressing against rotating tool 12 to hold tool 12 relative to spindle 14 in a clamped or tightened condition of device 10, as illustrated in FIG. 4. Flange member 36 also has an inner axial face 38 that is oppositely facing from axial face 32 of operating ring 26. Additional bearing devices or balls 44 are disposed between flange member 36 and operating ring 26. In this regard, axial face 38 of flange member 36 may also include a flat or unramped bearing surface or groove 41 defined therein that is oppositely facing unramped surface 34 defined in operating ring 26. A plurality of balls 44 may be operationally disposed between the opposing unramped surfaces.

Figure 7:
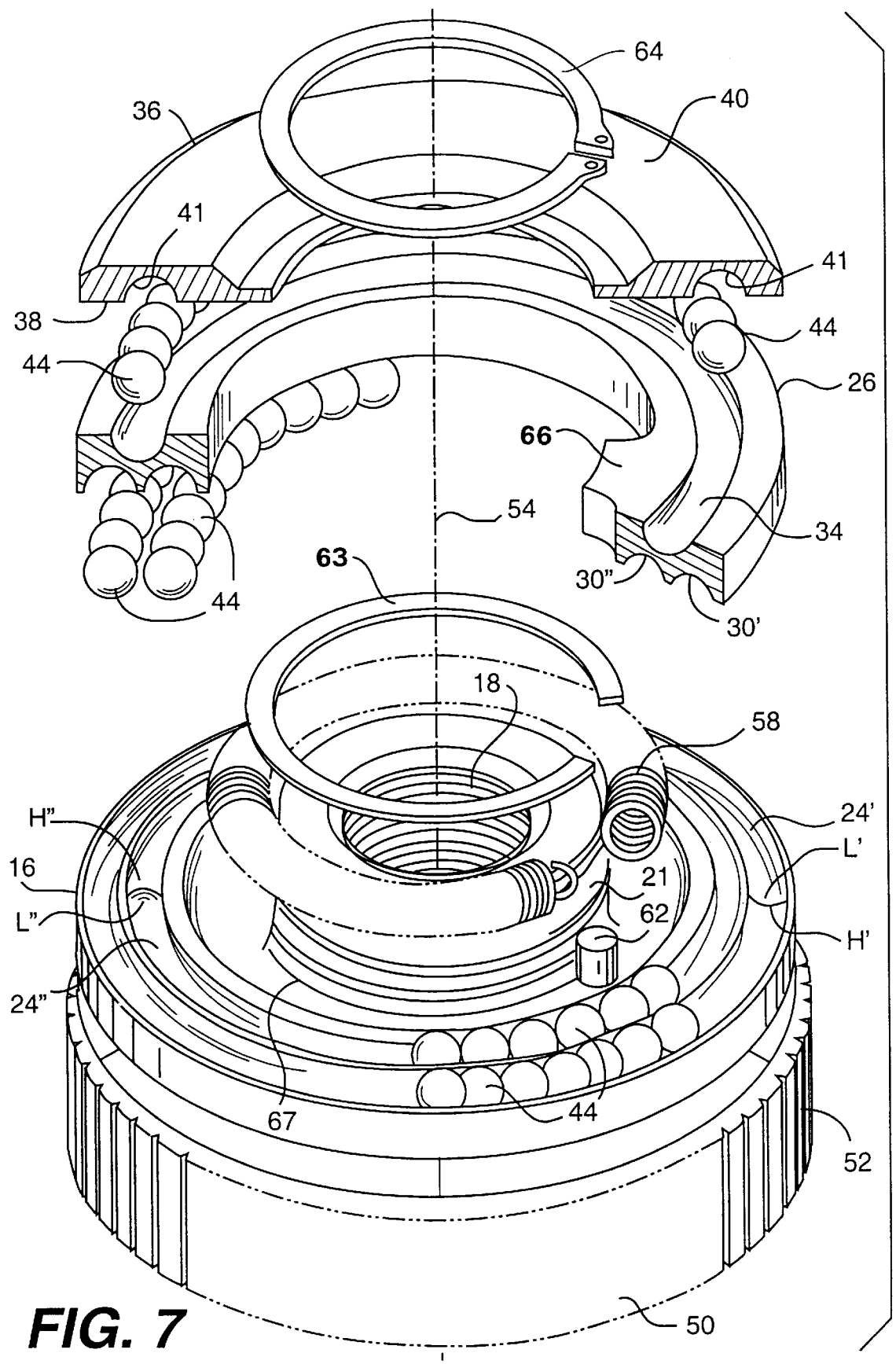
FIG. 7 is another in-line component view of the clamping nut.
Figure 8:
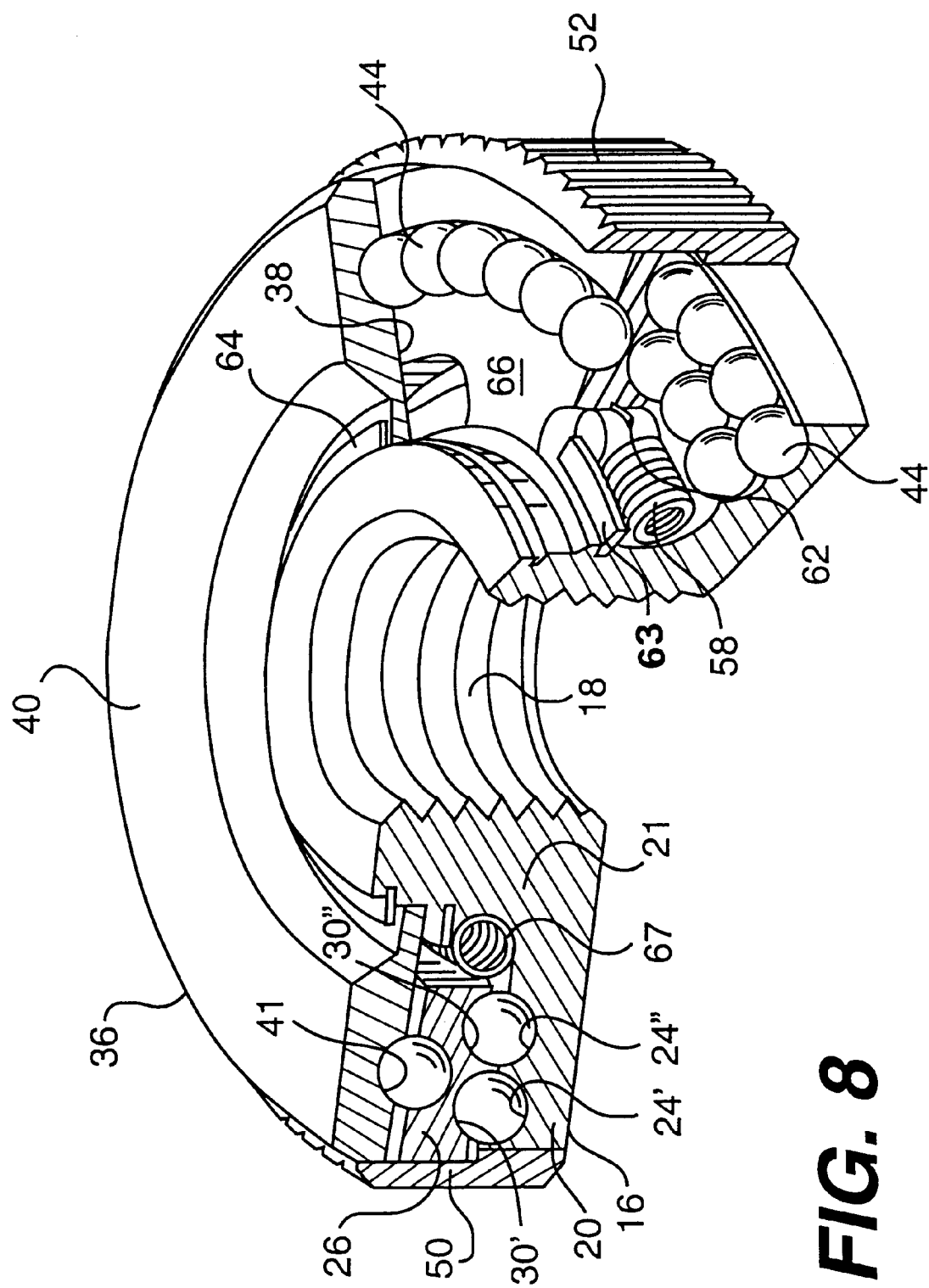
FIG. 8 is a partial cross-sectional perspective view of a clamping nut according to the invention.

As will be explained in further detail below, device 10 is rotatable from an at-rest or unclamped position, illustrated in FIG. 2, to a clamped or tightened position illustrated in FIGS. 3 and 4. In this regard, device 10 also may include a biasing element, such as resilient spring 58, to bias operating ring 26 to the unclamped position. Spring 58 may reside within a shoulder or recess 67 defined on body member 16 between threaded stem portion 21 and annular ring 20, and is held axially by retaining clip 63, as particularly illustrated in FIGS. 7 and 8. Spring 58 is attached at one end to a stop pin 62 formed in shoulder 67, as generally illustrates in FIGS. 7 and 8. The other end of spring 58 abuts against a drive dog 66 extending radially inward from operating ring 26, as particularly illustrated in FIG. 8. Thus, in the unclamped or at-rest position, spring 58 rotationally biases operating ring 26 so that drive dog 66 abuts against stop pin 62, as illustrated in FIG. 8.

The oppositely facing ramped bearing surfaces of annular ring 20 and operating ring 26 will now be described in greater detail with reference to FIGS. 5 through 7.

Figure 5:
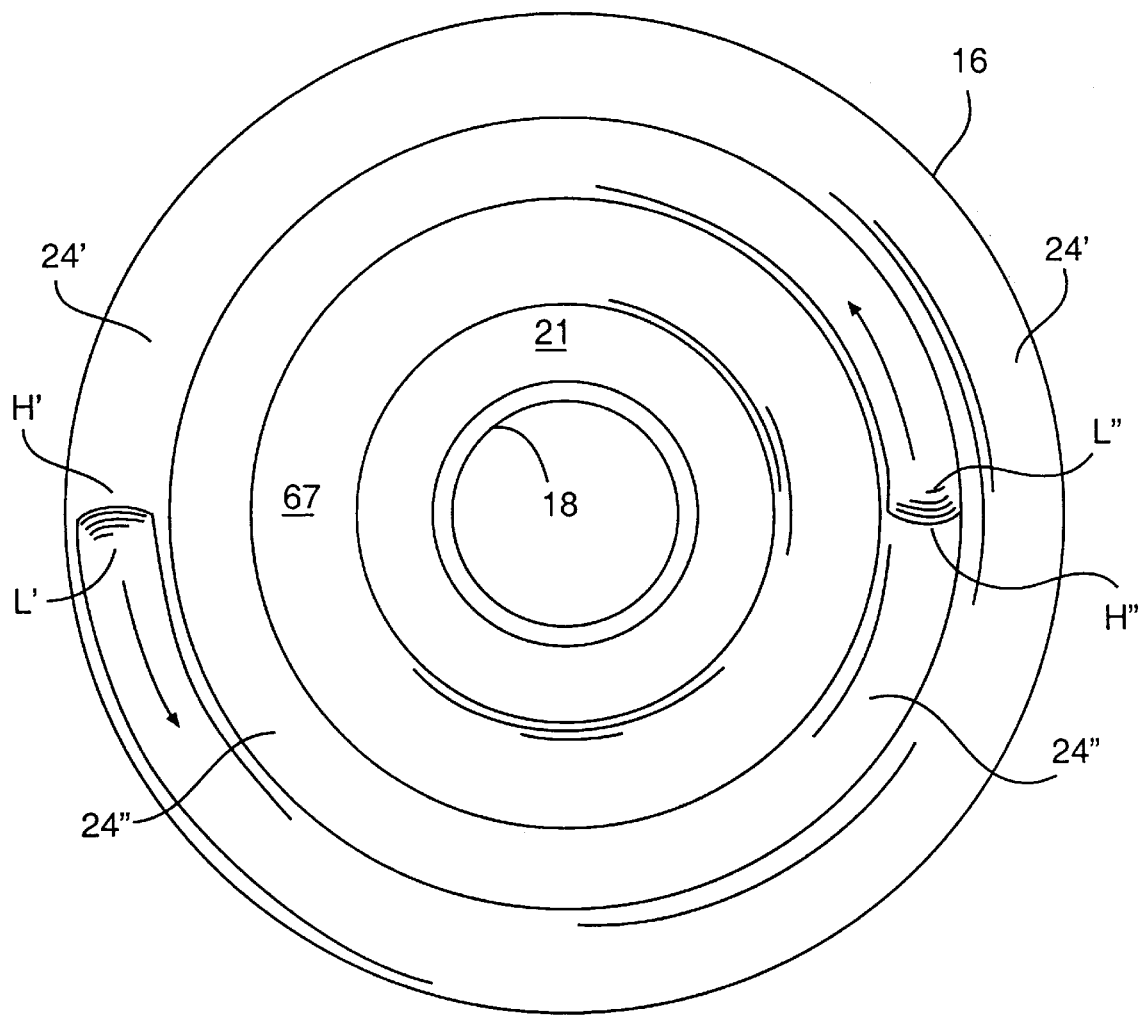
FIG. 5 is an axial view of the inner face of the body member according to an embodiment of the invention.

Referring to FIG. 5 in particular, outer circumferential ramped bearing surface 24' is gradually ramped from a low point L' to a high point H' in the direction indicated by the arrow. Referring to FIG. 6, the slope of line 25 indicates the degree of ramping. In a preferred embodiment of the invention, the surfaces are ramped generally within a range of about 0.010 to 0.020 inches. Preferably, the surfaces are ramped gradually and continuously around the circumference thereof so that the high point H' is directly adjacent to the low point L'. In a preferred embodiment, concentric ramped bearing surfaces are provided so that the operating ring 26 and flange member 36 move axially in a plane perpendicular to axis 54. In this regard, inner concentric surface 24" is similarly ramped from low point L" to high point H", as indicated in FIGS. 5 and 6. Inner ramped surface 24" has the same degree of ramp as outer ramp surface 24'. The high point H" of inner ramped surface 24" is directly radially opposite, with respect to longitudinal axis 54 of device 10, from high point H' of the outer ramped surface 24', as particularly seen in FIG. 5.

Figure 6:
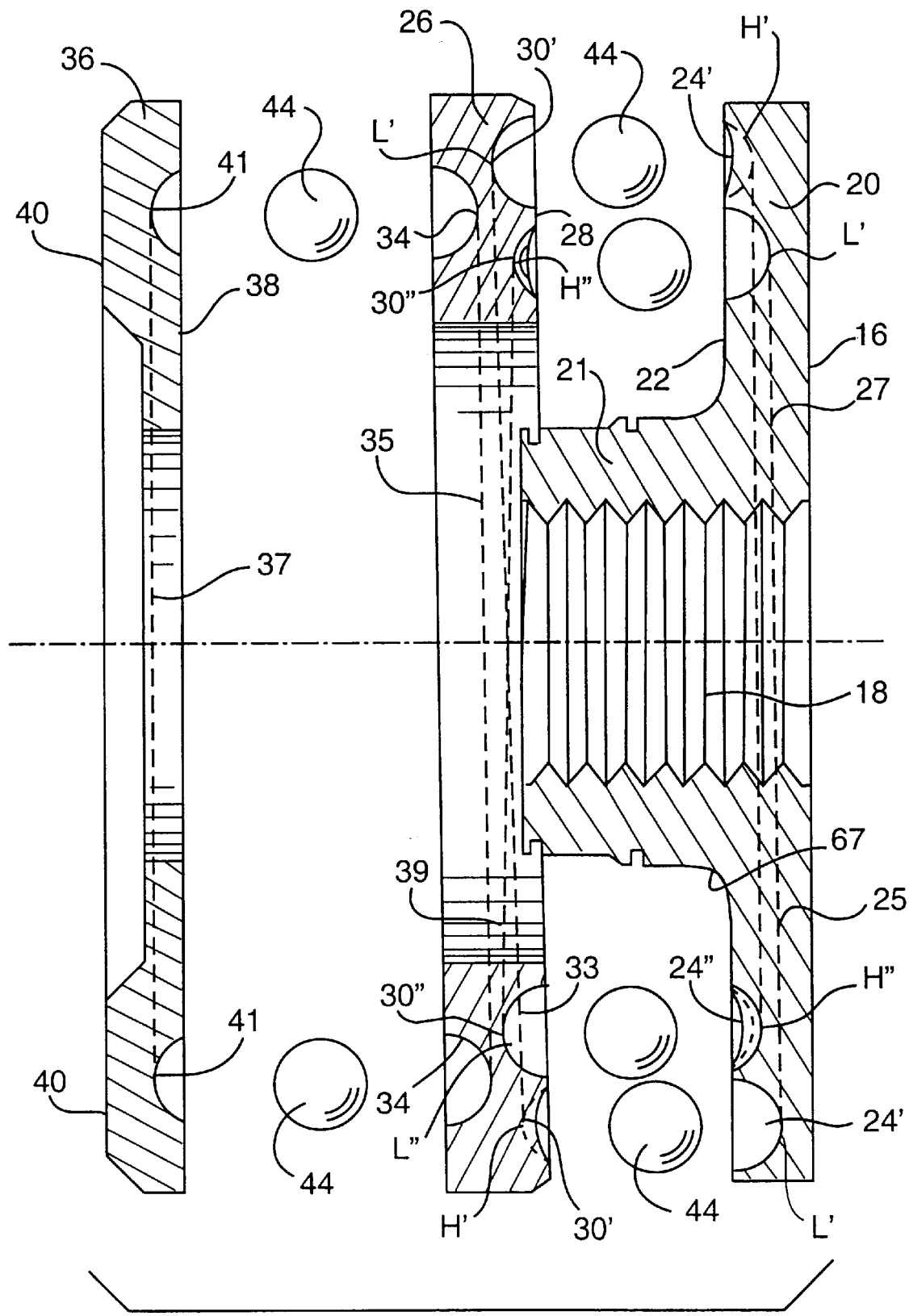
FIG. 6 is a partial in-line component view of the body member, operating ring, and flange member according to the invention particularly illustrating the sloped or ramped ball races or surfaces.

Ramped surfaces 30' and 30" that are oppositely facing surfaces 24' and 24" respectively are similarly ramped from low points to high points, as illustrated in FIG. 6. The slope of dashed line 33 between high point H' of outer ramped surface 30' to low point L' indicates the degree of ramp in the surface. Likewise, the slope of dashed line 39 indicates the degree of ramp of inner ramped surface 30".

As mentioned above, ramped surfaces 41 formed in flange member 36 and surface 34 formed in operating ring 26 are flat or unramped around the circumference thereof. Accordingly, dashed lines 37 and 35 respectively have no slope, as seen in FIG. 6.

Figure 2:
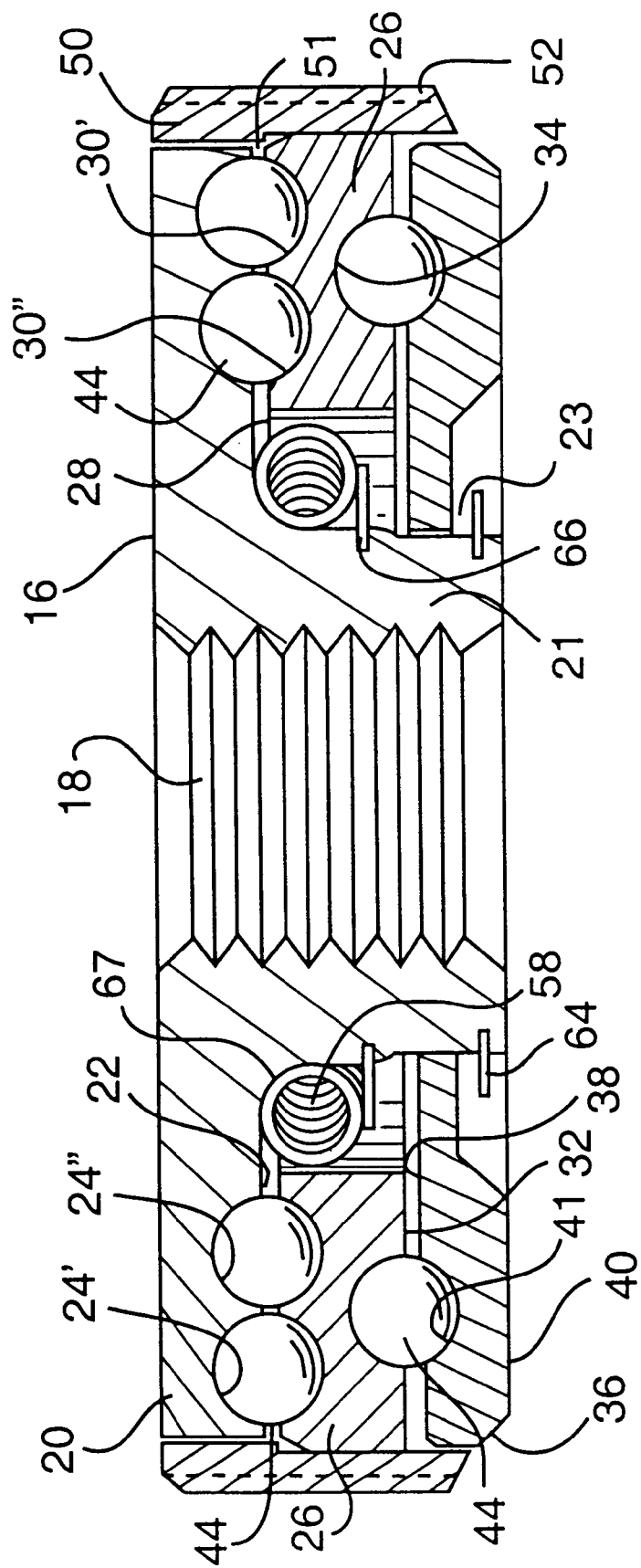
FIG. 2 is a cross-section view of the clamping nut illustrated in FIG. 1 taken along the lines indicated.

In the unclamped or at-rest position of device 10 illustrated in FIG. 2, operating ring 26 is rotationally biased so that the low points L' and L" in each of the ramped surfaces are oppositely facing or aligned. Thus, referring to FIG. 2, the space 51 between annular ring 20 and operating ring 26 is a minimum in this position. Flange member 36 is also axially movable relative to stem portion 21 of body member 16 up to retaining ring 64. In the unclamped or at-rest position of device 10, the space 23 between flange member 36 and retaining ring 64 is at a maximum.

Referring to FIG. 4 in particular, device 10 is initially threaded onto drive shaft 14 as a single rotating component. In other words, the operator manually grasps sleeve member 50 and threads the entire device 10 onto shaft 14. Eventually, surface 40 of flange member 16 will abut against tool 12 and the frictional loading between flange member 36 and tool 12 will exceed the internal frictional loading of the components and biasing force of spring 58. At this point, further rotation of sleeve 50 causes operating ring 26 to rotate relative to body member 16 and flange member 36. It should be understood that once operating ring 26 starts to rotate relative to body member 16, body member 16 will not be threaded any further onto the drive shaft. The back axial face 69 of body member 16 preferably does not contact tool 12 in the clamped position, as illustrated in FIGS. 3 and 4, so that there are essentially no frictional forces between body member 16 and tool 12 to overcome in subsequent loosening of the device, as will be explained in further detail below.

Further rotation of sleeve 50 and operating ring 26 in the tightening direction once surface 40 of flange member 36 has contacted tool 12 causes the high sections H' and H" of ramped surfaces 30' and 30" to rotate towards the high sections H' and H" of ramped surfaces 24' and 24". As the high points of the ramped surfaces rotationally approach each other, operating ring 26 is forced axially away from annular ring 20 and distance 51 between the components approaches a maximum, as illustrated in FIG. 3. As operating ring 26 moves axially away from annular ring 20, flange 36 is forced axially outward against tool 12 to apply a final clamping force to the tool. Retaining ring 64 ensures that flange 36 is not pushed off of body member 16.

It should thus be understood that, at least in the embodiment illustrated, sleeve 50 and operating ring 26 are rotated against the biasing force of spring 58 in a tightening direction until drive dog 66 has fully compressed spring 58 against stop pin 62. Spring 58, pin 62, and drive dog 66 prevent operating ring 26 from being rotated a full 360°, and thus prevent the high sections H' and H" from passing over the opposing high sections which would essentially cause the device to assume its unclamped position. Applicant has found that in one embodiment wherein the ramped surfaces are ramped at approximately 0.016 inches, rotation of the operating ring through an arc up to about 100° is sufficient to generate a clamping force of around 2500 pounds of force with about 30 inch/pounds of input torque against a steel tool, such as a saw blade. Thus, it should be understood, that the "clamping" position of device 10 can occur anywhere from the unclamped position to the theoretical maximum clamping position wherein the high ramped sections are directly opposite from each other.

In the embodiment of the invention illustrated in the figures, applicant has found that the internal frictional loading of the components is sufficient to retain operating ring 26 in its clamped position without the necessity of an additional rotational locking device. In other words, the biasing spring 58 or operating vibrations imparted to the device will not cause the operating ring 26 to rotationally return to the unclamped position thereby releasing the clamping device 10. However, it should be understood, that it is within the scope and spirit of the invention to include an additional rotational locking device, such as a click spring or similar mechanism.

The clamping device 10 according to the invention is also relatively simple to remove or rotate to its unclamped position. To loosen or unclamp device 10, the operator grasps sleeve 50 and rotates the sleeve and operating ring 26 in the loosening direction. This action is aided by the biasing force of spring 58. As operating ring 26 moves with the aid of spring 58 towards the loosened or unclamped position, the low sections of the opposing ramped surfaces will come into alignment which allows flange 36 to move axially away from tool 12. Once this happens, the rotational frictional load between flange 36 and tool 12 is relieved and device 10 can then be unthreaded from shaft 14 as a unitary component. Since axial face 69 of body member 16 was not in frictional rotational engagement with tool 12, the only rotational frictional forces that must be overcome are those that exist between the threads 15 of drive shaft 14 and body member 16.

It should be appreciated by those skilled in the art that various modifications and variations can be made in the present invention without departing from the scope and spirit of the invention. For example, it is not absolutely necessary that the ramped ball races or surfaces are ramped continuously from the low point to the high point. Also, it is not absolutely necessary that the ball races are ramped over the entire circumference thereof. Additionally, bearing devices other than rolling balls 44 can also be used. For example, roller bearings are within the scope of the invention. Such roller bearings would roll against opposing ramped surfaces. Thus, it would not be necessary to define the opposing ramped surfaces as circular ball grooves. Alternatively, a bearing washer or ring, or a lubricating coating on the ramped surfaces, could be used as the bearing device. Any number of additional variations and modifications can be made in the structure of the individual components. It is intended that the present invention cover such modifications and variations as come within the scope of the appended claims and their equivalents.

What is claimed is:

1. A clamping device for holding a rotating or stationary object to a threaded drive shaft, said clamping device comprising:

a body member having an inner circumferential threaded surface for engagement with the threaded drive shaft;

an annular ring configured with said body member, said annular ring comprising an inner axial face with at least one ramped bearing surface defined thereon;

an operating ring rotationally mounted on said body member and configured for accepting an externally applied rotational drive force, said operating ring further comprising a first axial face opposite said annular ring inner axial face, said first axial face having at least one ramped bearing surface defined thereon oppositely facing said ramped bearing surface on said annular ring inner axial face; said operating ring further comprising a second axial face with at least one bearing surface formed thereon;

a flange member having an inner axial face opposite said operating ring second axial face, and an outer axial face configured for pressing against and clampingly holding a rotating tool on said drive shaft, said flange member rotatably mounted on said body member and axially movable relative thereto;

a bearing mechanism disposed between said ramped bearing surfaces of said annular ring and operating ring, and a bearing mechanism disposed between said operating ring and said flange member inner axial face; and wherein said operating ring is manually movable from an unclamped position wherein lowest portions of said ramped bearing surfaces are oppositely aligned, to a clamping position wherein highest portions of said ramped bearing surfaces are oppositely aligned causing said flange member to move axially outward against the object to be held without further threaded rotation of said body member on said threaded drive shaft.

2. The clamping device as in claim 1, wherein said annular ring is formed integral with said body member.

3. The clamping device as in claim 1, further comprising a sleeve member rotationally coupled to said operating ring, said sleeve member comprising an outer circumferential gripping surface.

4. The clamping device as in claim 1, wherein said ramped bearing surfaces are generally circular and gradually ramped from said lowest portion to said highest portion along generally the entire circumferences thereof.

5. The clamping device as in claim 4, wherein said ramped bearing surfaces are ramped generally within a range of about 0.010 to 0.060 inches from said lowest portion to said highest portion.

6. The clamping device as in claim 4, further comprising at least two concentric said ramped bearing surfaces defined on said operating ring and said annular ring which are disposed radially opposite relative to a longitudinal axis of said clamping device so that said operating ring moves axially relative to said annular ring member in a plane perpendicular to said longitudinal axis.

7. The clamping device as in claim 6, wherein said operating ring second axial face bearing surface is generally flat.

8. The clamping device as in claim 7, further comprising a generally flat bearing surface defined on said flange member inner axial face opposite said operating ring second axial face bearing surface.

9. The clamping device as in claim 1, wherein said operating ring is biased towards said unclamped position.

10. The clamping device as in claim 9, further comprising a resilient member operationally disposed between said operating ring and said annular ring member.

11. A clamping device for holding a rotating or stationary object to a threaded shaft of a power tool or machine, said clamping device comprising:

a body member having a threaded portion for threaded engagement with said drive shaft, and an annular ring formed on one end of said body member;

at least two circumferentially ramped surfaces defined on an inner axial face of said annular ring, said ramped surfaces comprising a high ramp section that are radially opposite each other relative to a longitudinal axis through said body member;

an operating ring rotationally mounted on said body member and configured for accepting an externally applied rotational drive force, said operating ring further comprising a first axial face having complimentary circumferential ramped surfaces formed thereon opposite said annular ring ramped surfaces, wherein said operating ring is rotatable from a release position wherein low ramp sections defined on said operating ring are axially opposite low ramp sections defined on said annular ring, to a clamping position wherein high ramp sections defined on said operating ring are aligned axially opposite said high ramp sections on said annular ring;

a flange member having an inner axial face opposite a second axial face of said operating ring wherein said operating ring is rotationally disposed between said flange member and said annular ring of said body member, said flange member axially movable relative to said shaft upon rotation of said operating ring; and a bearing disposed between said operating ring and said annular ring permitting rotation of said operating ring between said release position and said clamping position.

12. The clamping device as in claim 11, wherein said ramped surfaces comprise separate concentric grooves, and said bearing comprises rolling bodies held within said grooves.

13. The clamping device as in claim 12, wherein said grooves define complete circular grooves.

14. The clamping device as in claim 13, wherein said grooves are gradually ramped from said low ramp sections to said high ramped sections in a tightening direction.

15. The clamping device as in claim 14, wherein said grooves are ramped generally within a range of about 0.010 to 0.060 inches from said low section to said high section.

16. The clamping device as in claim 11, further comprising a spring mechanism biasing said operating ring to said release position.

17. The clamping device as in claim 11, further comprising a gripping surface formed on an outer circumferential surface of said operating ring.

18. The clamping device as in claim 17, further comprising a sleeve member rotationally coupled to said operating ring, said gripping surface defined on said sleeve member.

19. A clamping device for holding a rotating or stationary object to a threaded drive shaft, said clamping device comprising:

a body member having an inner circumferential threaded surface for engagement with the threaded drive shaft;

an annular ring configured with said body member, said annular ring comprising an inner axial face with at least one ramped bearing surface defined thereon;

an operating ring rotationally mounted on said body member and configured for accepting an externally applied rotational drive force, said operating ring further comprising a first axial face opposite said annular ring inner axial face, said first axial face having at least one ramped bearing surface defined thereon oppositely facing said ramped bearing surface on said annular ring inner axial face; said operating ring further comprising a second axial face with at least one bearing surface formed thereon;

a flange member having an inner axial face opposite said operating ring second axial face, and an outer axial face configured for pressing against and clampingly holding a rotating tool on said drive shaft, said flange member rotatably mounted on said body member and axially movable relative thereto;

a bearing mechanism disposed between said ramped bearing surfaces of said annular ring and operating ring, and a bearing mechanism disposed between said operating ring and said flange member inner axial face;

wherein said operating ring is manually movable from an unclamped position wherein lowest port ions of said ramped bearing surfaces are oppositely aligned, to a clamping position wherein highest portions of said ramped bearing surfaces are oppositely aligned causing said flange member to move axially outward against the object to be held without further threaded rotation of said body member on said threaded drive shaft;

wherein said operating ring is biased towards said unclamped position; and further comprising a resilient member operationally disposed between said operating ring and said annular ring, said resilient member comprising a compressible spring, said operating member further comprising a radially extending drive dog in engagement with one end of said spring and said annular ring comprising a stop in engagement with an opposite end of said spring.

20. A clamping device for holding a rotating or stationary object to a threaded shaft of a power tool or machine, said clamping device comprising:

a body member having a threaded portion for threaded engagement with said drive shaft, and an annular ring formed on one end of said body member;

at least two circumferentially ramped surfaces defined on an inner axial face of said annular ring, said ramped surfaces comprising a high ramp section that are radially opposite each other relative to a longitudinal axis through said body member;

an operating ring rotationally mounted on said body member and configured for accepting an externally applied rotational drive force, said operating ring further comprising a first axial face having complimentary circumferential ramped surfaces formed thereon opposite said annular ring ramped surfaces, wherein said operating ring is rotatable from a release position wherein low ramp sections defined on said operating ring are axially opposite low ramp sections defined on said annular ring, to a clamping position wherein high ramp sections defined on said operating ring are aligned axially opposite said high ramp sections on said annular ring;

a flange member having an inner axial face opposite a second axial face of said operating ring wherein said operating ring is rotationally disposed between said flange member and said annular ring of said body member, said flange member axially movable relative to said shaft upon rotation of said operating ring;

a bearing disposed between said operating ring and said annular ring permitting rotation of said operating ring between said release position and said clamping position;

a spring mechanism biasing said operating ring to said release position; and wherein said operating ring comprises a dog engaging said spring mechanism on one end thereof and said annular ring has a stop defined thereon engaging said spring mechanism on an opposite end thereof.

* * * * *